(12) United States Patent
Hojaji

(10) Patent No.: US 6,615,463 B1
(45) Date of Patent: *Sep. 9, 2003

(54) METHODS TO SOLIDIFY CREMATION ASH

(76) Inventor: Hamid Hojaji, 8117 Lilly Stone Dr., Bethesda, MD (US) 20817

( * ) Notice: Subject to any disclaimer, the term of this patent is extended or adjusted under 35 U.S.C. 154(b) by 0 days.

This patent is subject to a terminal disclaimer.

(21) Appl. No.: 10/139,648

(22) Filed: May 7, 2002

Related U.S. Application Data

(63) Continuation-in-part of application No. 09/729,110, filed on Dec. 5, 2000, now Pat. No. 6,382,111.

(51) Int. Cl.⁷ .............................................. A61G 17/00
(52) U.S. Cl. ............................................. 27/1; 110/341
(58) Field of Search ........................... 27/1; 428/542.2; 264/601, 602; 110/349, 341

(56) References Cited

U.S. PATENT DOCUMENTS

| | | | | |
|---|---|---|---|---|
| 1,640,680 A | * | 8/1927 | Vanderlaan | 428/542.2 |
| 5,016,330 A | * | 5/1991 | Botsch | 27/1 |
| 6,170,136 B1 | * | 1/2001 | Wilson-Brokl | 27/1 |
| 6,200,507 B1 | * | 3/2001 | Dennis | 264/73 |
| 2002/0025392 A1 | * | 2/2002 | Yardley et al. | 428/3 |

FOREIGN PATENT DOCUMENTS

| | | | |
|---|---|---|---|
| WO | WO 92/14433 | * | 9/1992 |
| WO | WO 99/64369 | * | 12/1999 |

* cited by examiner

*Primary Examiner*—William L. Miller
(74) *Attorney, Agent, or Firm*—Liniak, Berenato & White, LLC

(57) ABSTRACT

Residual bones, and ashes from the cremation process of deceased humans and animals are turned into solid objects containing glass, ceramics, clay based materials, or composites such as organic polymer matrix, metal matrix, or inorganic cementaceous matrix, or combination of thereof. In another embodiment, ash is mixed with at least a liquid phase such as paint or coating, which upon dying or heating the mixture becomes solid. The final solid product can be made into any shapes or forms that the matrix can be made into without the addition of the ash. The final form of the product thereof can range from abstractive non-functional to geometrical shapes or functional forms such as containers, vases, or in the form of jewelry stones. Or painting, drawing, coating, and glazing. The objects can be made to contain almost all ash, such as in the case of ceramics or partially loaded with ash as is the case for glass and composites. In one other embodiment, the cremation residue either in a solid form or powdery form can be encapsulated in glass, ceramics, and various composites to form a heterogeneous product. The finished products can be marked with identification formats such as bar codes which make them possible to be traced electronically in a data base environment.

19 Claims, No Drawings

METHODS TO SOLIDIFY CREMATION ASH

CROSS REFERENCE TO RELATED APPLICATIONS/CLAIM TO PRIORITY

This application is a continuation in part of application Ser. No. 09/729,110, filed Dec. 5, 2000, by Hamid Hojaji, entitled Methods to Solidify Cremation Residues, now U.S. Pat. No. 6,382,111, the disclosure of which is herein incorporated by reference, and priority of which is claimed.

BACKGROUND OF INVENTION

1. Field of the Invention

The instant invention describes a method to convert ashes or other remains of the cremation (such as bone fragments) into solid, durable objects and/or ornamental products such as composite, coloring and paints.

2. Description of Related Art

Cremation has been used worldwide for many centuries by many societies. The method has been chosen over burial either because of religious reasons or the convenience of reducing a body mass into ashes. The ashes can last indefinitely, primarily because ashes contain inorganic matters, which will never spoil. Traditionally, the method of cremation has been practiced in eastern societies such as among Hindus in India and a large sector of Buddhist followers. The cremation practice is becoming more popular among western countries including the United States in the recent years, and cremation currently accounts for 24% of all final dispositions in the United States.

Cremation is also being used with increasing numbers for deceased pets too.

Traditionally, ashes resulting from cremation have been placed and stored in closed containers, called urns. These ash samples are normally a very small fraction of the cremation residue. As ash, they are very fine powdery materials and can spread readily into dust. As a result if the container is broken or ash is poured out accidentally, it will be very difficult if not impossible to collect them back into the container. Consequently, the containers of ash samples are normally kept in a secure place to avoid spillage. These secure locations are normally out of view.

The need exists for a method to convert remains to a solid, durable object that not only has spiritual and moral values, but it is appealing to the eyes and can have also functional and decorative properties.

SUMMARY OF THE INVENTION

Accordingly, it is an objective of the present invention to provide a method to convert ashes or other remains of the cremation (such as bone fragments) into solid and durable objects such as glass, ceramics, clay like objects or embedded into polymers such as epoxies, metals or variety of cementaceous materials such as Portland cement or plaster. Another objective of the present invention is to formulate paints and colors that in part contain ash, and are used to create paintings, drawings and colorings. It should be noted that for the sake of simplicity, the word solid from now on covers all the claimed products of glass, ceramics, clay-based materials, all composites, colors, paints, and shades that contain cremation ash. These solid objects can be made to be functional such as decorative jewelry, glass containers, ceramics or clay wares, or non-functional, such as abstractive shaped art forms and paintings. It must be clear that the present invention is not limited to any shape and forms of the final product because unlimited shapes and forms can be fabricated. The final product can also be machined into other forms or be framed in the case of paintings.

Additionally, the present invention allows the cremation residue to become an object that not only has spiritual and moral values, but it is appealing to the eyes and can have also functional and decorative properties.

Still is another objective of the present invention to establish a data base for maintaining all the pertaining information about the deceased and the product that was made thereafter.

The residue from the cremation process which is primarily inorganic is used to produce a variety of solid objects including but not limited to glass, ceramics, or a clay based materials, composites and paint and colorings. The inorganic residue may be in part or wholly selected from ashes or bony remains. Both, bottom ash (normally left at the bottom of cremation chamber), or fly ashes (very fine ash that is transported to the exhaust stack and filtered before being releasing to the outside air) can be used. For glass, ceramics and clay-based products, appropriate additives may be added to the cremation residue to adjust the composition of the mixture in order to produce a durable and stable product. Additives may also be added to impart color or other artifact to the product. In the case of composites, the ash will form the dispersive phase (or particles dispersion phase) and the matrix phase can be selected from variety of organic polymers, or inorganic cementaceous systems such as Portland cement or gypsum, or metallic systems such as aluminum, copper and other metal and alloys. The products fabricated according to the method of the present invention may still undergo other secondary processes such as cutting, grinding, shaping, coloring, etc. before becoming the final products. In another embodiment of the present invention ash is blended with a liquid or multiple of liquids and other solids. The resulting mixture can be used as paints, colorings, or shades to create work of arts such as paintings and alike, which solidify upon drying. Unlimited combinations and shapes can be produced from glass, ceramics, clay-based formulations, and various composites. In general, any shape and form that these solidified materials can take without the addition of ash are possible. A computer database may be employed to maintain all the pertaining information related to product and the deceased.

It is also possible to blend the residue with at least one liquid to form a functional, decorative product comprising at least one of a paint, colorant, shade, glazing, or combination thereof.

The residue may be defined by at least one of ashes and bone fragments. In other words, the residue may be selected from the group comprising ashes, bone fragments, and combinations thereof.

It is also possible to encapsulate the cremation residue in various materials instead of blending as described above. Accordingly the encapsulant can be selected from one or multiple of glass, ceramics, polymers, metals and paints.

DETAILED DESCRIPTION OF THE INVENTION

The present invention is directed toward the production of solid objects, which are durable, and stable from the cremation residues of humans and animals.

Material objects in accordance with the present invention are made by solidifying the cremation residues, which are primarily or entirely inorganic. Amount of cremation ash needed for processing depends on the size, and number of finished products. Normally, small quantities are needed for single item products, from few grams to as much as several hundred grams. Since large quantities of residue remains after the cremation, large or multitude of products can be fabricated without any material shortage. The residue is normally heterogeneous; and it can be homogenized by conventional techniques such as milling, grinding and other homogenizing equipment. The residue may also contain organics and elemental carbon, which is formed by Pyrolysis of organic matters. If the carbon content is high, it may interfere with the solidification by glass melting or ceramic processing. For example if total carbon content of glass formulation is more than several wt %, foaming or reduction of glass may occur at high temperatures. If foaming or reduction become a problem, then the sample may be subjected to an initial heating in air or pure oxygen to oxidize the residual carbon. This is simply accomplished by placing the sample in an appropriate container such as a ceramic dish and heated in a furnace to about 600–1000° C. for approximately several minutes to several hours depending on the temperature. The higher temperature requires shorter residence time. After heating the oxidized sample is removed from the furnace and is allowed to cool down. A post grinding may be required to finely divide the ash into a powdery material. The fine powder forms the precursor to all of the products fabricated according to the methods of the present invention. The term cremation ash will be used interchangeably with cremation residue throughout the text from now on. Cremation ash is normally rich in oxides of calcium and phosphors forming the mineral apatite $Ca_5(OH,F)(PO_4)_3$. If a glassy product is desired, appropriate amounts of glass forming compounds will be added to the ash in order to produce a stable and durable glass. The most important component of stable phosphate glasses is $Al(PO3)_3$. Therefore, addition of $Al_2O_3$ as an additive to the sample is used to promote a stable glass formulation. Other conventional glass forming additives such as silica $SiO_2$, boron oxide $B_2B_3$ and alkali oxides such as $Na_2O$, $K_2O$, and $Li_2O$ can be added extend the glass-forming region of the sample. Glass coloring agents can be added to the mixture to impart various colors to the final glassy product. For instance copper oxide can be added to impart a ruby color to the product. Conventional electric or gas-fired kilns can be used to melt the glass. The sample and additives are mixed together using conventional techniques such as ball milling or mixing in a mortar and pestle. The mixture is then charged in either a metallic (such as platinum) or a ceramic crucible and melted to above its melting temperature. Melting temperature is generally kept below 1500° C., preferably, below 1400° C.; thus inexpensive ceramic crucibles such as clay crucibles can be used. Melting temperature is affected by types and quantities of additives mixed with the cremation ash.

In one other embodiment with glass, molten glass can be used to encapsulate the cremation residue. However, this method requires calcination of the residue to completely remove any carbonaceous or organic mater, other wise bubbles will form around the residue, which reduce the strength of the final product.

Alternatively, numerous ceramic formulations can be made with the sample. In addition, many glass-ceramic compositions can be formulated which contain both amorphous glass and crystalline phases. According to the preferred method of the present invention, ceramic products can be fabricated from variety of ceramic systems, including porcelain, alumina, alumino-silicates, mullite, cordierite, and zirconates. The major criteria for selection is ease of processing, durability, dimensional stability, and low cost.

The porcelain system is the most preferred ceramic system. Ceramic processing is carried out by first blending the ash with the ceramic raw materials in a blender, mill or a grinder. The blend is optionally mixed with a ceramic binder such as polyvinyl alcohol and then pressed in a die to the desired shape. The shapes are normally geometrical by uniaxial pressing. However, complex shapes can be easily attained by hydrostatic pressing. The ceramic piece is subsequently transferred into a furnace and is fired to around 800–1200° C. to form a consolidated (dense) ceramic object which is strong and durable. Firing can be done in an electric or a gas fired furnace. Other means of heating can also be used such as microwave, infrared, or induction heating.

The ceramic fabrication method according to the present invention can easily be automated for high volume production. Examples of such automated systems can be found in tiles and ceramic ware manufacturing plants. In addition, the ceramic pieces produced by the method of the present invention can be glazed or decorated in various ways. The most common procedure is to fire the piece without a glaze to sufficiently high temperature to induce sintering, and then a glaze is applied and fired at low temperatures. Another method is to fire the piece initially to a low temperature "bisque fire", then apply the glaze and sinter the piece and the glaze at a higher temperature. A third method is to apply the glaze to the unfired piece and heat them together in a one-fire process. All glazing process can be automated for high volume production.

In another embodiment in accordance with the present invention, base oxides can be added to the ash to formulate ceramic materials. For example, $Al_2O_3$, $SiO_2$, $ZrO_2$, $CaO$, $MgO$, etc will produce stable ceramic formulations. Cremation ash can be incorporated with these oxide to produce stable and durable ceramics. Other conventional ceramic forming oxides such as $TiO_2$, $BaO$, etc. can be added to increase the green body strength and shaping characteristics.

Clay bodies can be made from the cremation ash in accordance with the present invention. There are numerous methods and additives to produce acceptable and high quality clay formulations. Clay has some unique characteristics that make it possible to form products with almost any shapes and forms. The shaped object hardens as it dries, and when subjected to sufficient heat, it partially vitrifies and becomes almost indestructible. The clay based products produced by the preferred method of invention uses mostly ready mix formulations such as earthenware, stoneware, and special bodies such as Raku or Porcelain. The advantage of ready mix formulations is to shorten the turn around time for clay products. However, powdered clay products such as red and white earthenware, bone china, and stoneware can be blended with the ash into a plastic body (i.e. shapeable) prior to the forming processes. Clay based materials like ceramic products can be shaped by pressing, however, because of possessing a plastic nature they can be shaped by free hand forming (or hand building) techniques or using conventional clay throwing wheels and machines. The cremation ash is preferably calcined and ground before clay based formulation to increase the strength and durability of the product. The firing temperatures for clay products are generally in the same range of ceramic products, normally between 1000–1200° C. Glazing of clay products can be done by the same techniques used for ceramics as described previously.

Cementaceous products incorporate the ash sample into a cementaceous mixture. By far this class of products is the easiest to fabricate, and probably the fastest to turn around. The prime candidates for cementaceous products are Portland cement, magnesia based, plasters, lime cements, phosphate based cements, alumina-based cements, pottery cements, and pozzolanic cementing systems. The proportioning of the sample material and the cement body can vary from several wt % of sample to more than 90%, depending on type of cement used, and the final product durability, stability, and other physical and chemical properties. Small addition of plasticizers such as melamine or naphthalene can be used with water to improve the workability of the cementaceous mixtures. Prior to hydration, ash and cement are intimately mixed and preferably ground together. Easy molding of cementaceous mixture permits to generate many shapes and forms. Cementaceous materials are normally set and hardened at room temperature, and thus firing to high temperatures is not required.

Cremation ash polymer matrix produced by the method of the present invention includes nearly all-commercial thermoplastic and thermosetting polymers. Conventional simple casting for both types of polymers can be used. The sample materials can be added in a appropriate proportions that may vary from several wt % to more than 90%, again depending on the final product durability, stability, and other physical and thermal properties.

Commercially available thermoplastic polymers such as polystyrene, polypropylene acrylics, and nylon beads are mixed with ash, heated and cast into various shapes. The turn around time is relatively short. Colorants in the form of pigments and dyes can be added to impart various colors. Injection molding system for the thermoplastic type polymer matrix can be utilized, the cycle time for this process is very short normally within the range of 10 to 30 seconds, which allows for large commercial production rates. Equally, commercially used thermoset polymers such as epoxies, phenolics, and polyesters, can be used to fabricate hard and impact resistance products. Simple casting can be used to fabricate polymer matrix composites, and automation for large production rates can be achieved by compression and transfer molding. Complex geometries can be achieved by this method. One preferred method of the present invention, uses epoxy filled metal powders and the cremation ash to fabricate solid composites, which can be readily machined after hardening into various shapes and forms.

In other related embodiments according to the present invention, cremation residue can be heterogeneously encapsulated in ceramics, clay-products, cementaceous products, and polymers. It must be noted that the heterogeneous encapsulation is less preferred than the homogenous formulations described above, since cremation residue remains as a discrete phase. But nevertheless it can be used in the cases that homogenous formulation is less likely to produce products in a timely and inexpensive manner. In heterogeneous encapsulation, total destruction of carbonaceous residues may not be required.

Powder metallurgy fabrication technique is the preferred choice to produce metal matrix ash composites according to the present invention. Metal matrix composites have all the characteristics of metals, except they contain a dispersed phase of fine ash in their make up. Cremation ash is finely grounded and is added to the metal of choice, normally in the powdery form. However, molten metal can be cast or poured around a solid piece of ash material to encapsulate it. Metal matrix products according to the present invention can include ferrous and non ferrous metals such as tin, aluminum, zinc, copper, titanium, silver, gold, platinum, and their alloys such as sterling silver, brass, bronze, etc. It must be noted that other commonly used fabrication methods such as forging, rolling, extrusion, drawing, and all casting methods such as sand, die, and investment castings may be used to fabricate metal ash composites. In the most preferred embodiment according to the present invention powder metals and fine ash are mixed at room temperature and shaped into a form, preferably by pressing. This step is very similar to forming ceramic bodies. Binders may be used to produce stronger green objects. The metal matrix ash composite is then subjected to the sintering temperature of the metal used which is normally below the melting temperature of the metal. During the heating period, the atmosphere around the object being sintered needs to kept reducing (absence of oxygen as much as possible) to minimize oxidation of the metal phase. Nobel metals such as platinum, silver, gold and other metals such as tin and lead can be sintered in air since they have low affinity for oxidation.

According to the preferred method of the present invention the ash particles should be kept below 100 mesh most preferably below 200 mesh to produce strong composites having a fine microstructure and free of large voids. In another embodiment ash can be added to molten metals or vise versa. In almost all cases the molten metal and ash are not miscible and ash will float over the top of the molten metal even in the case of aluminum which has a density of about 2.7 grams/cm$^3$. In this case after cooling, the composite may be cold worked to make the ash to become filly or partially embedded into the metal matrix. Another embodiment is to pour or cast molten metal around a solid piece of ash (may be pre-sintered by ceramic or clay processing) to cause encapsulation of ash in the metal matrix. Among the metals testes tin was the easiest to work with at its molten state since it has a good resistance to oxidation in air and low melting temperature at or below 300° C. Aluminum melts at about 660° C. (must be melted under reducing conditions), copper melts around 1090° C., and needs to be kept reduced. Silver and gold are good candidates too, both have melting temperatures below 1200° C. and are resistive to air oxidation. Bronze, brass, and sterling silver are among many metallic alloys that can be used for composite formulation. The final product formed either by solid state sintering or melting can be machined into various shapes and forms.

Paint made from cremation ash is produced by mixing ash with paints (such as: ceramic based paint, oil based paint, acrylic based paint and water based paint), colorants, or various shades. For the sake of clarity the paint made from the cremation ash is termed "Ash-Paint" throughout the text. The ash-paint applies to both liquid and solid compounds made from ash and any other material(s) that ordinary is used to impart colors or shades to any object. The amount of ash added to the paint can vary from less than one wt % to as much as 50–70 of wt %. According to the preferred method of the present invention 1–20 wt % of fine cremation ash is thoroughly blended with a typical liquid or paste like paint or glazing. The resulting mixture can be brushed, sprayed, dipped, poured or applied by any other non limiting techniques to create a marking on a surface. The marking can be in the form of drawing, coating, painting, glazing or any combination thereof. In a preferred way of performing the present invention, the surface is one of paper, metal, glass, ceramics, plastics, skins, canvas, textile, wood, and any other material. It is also possible to mix the ash first with coloring compounds in the solid state, and then add appropriate liquid (s) or other solids to provide a suitable ash-paint product. It must be noted that the present invention does not set any limitation in making an ash-paint product from the cremation ash. Anyone skilled in mixing solids or solids with liquids should be able to use the method of the present invention to generate paint like product from cremation ash.

The term ash-paint also applies to coatings which can be applied both in solid or liquid states on various surfaces. The ash paint made by the method of the present invention can be applied to other objects that contain cremation ash made by other methods of the present invention. For instance, clay based bodies made with cremation ash, can be glazed with ash containing glazes.

Table 1 summarizes the average processing times and major processing steps for various products fabricated according to the methods of the present invention:

TABLE 1

| Product Line | Process Time, hrs | Step 1 | Step 2 | Step 3 | Step 4 |
|---|---|---|---|---|---|
| Glass | 10–14 | Mixing | Melting | Casting | Annealing |
| Ceramics | 4–6 | Mixing | Shaping, and pressing | Firing | Annealing |
| Clay Products | 4–6 | Mixing | Shaping, and glazing | Firing | Annealing |
| Cementaceous Composites | 24 | Mixing | Shaping, and molding | Curing | NA |
| Polymer Matrix | 24 | Mixing | Casting, and pressing | Curing | NA |
| Ash-paint | 0.5–2 | Mixing | Painting/coating | Drying | |
| Metal Matrix Composites | 2–4 | Mixing | Melting, or pressing | Casting | NA |

All the objects made according to the methods of the present invention can be post identified through a controlled computerized database. This could be done for example by assigning individual bar code for each product. The bar codes upon recognition by a secure network can reveal various information related to the product, such as date of fabrication, percentage of cremation ash, type of process, and optionally personalized information about the deceased.

EXAMPLES

The preparation of cremation ash products made in accordance with the present invention is illustrated by the following non-limiting examples.

Example 1

This example illustrates the simulation of a cremation process using beef bones with residual meat. It further illustrates the calcination process required to produce cremation materials free of carbonaceous residues (including organic matters).

Beef bones and meat were heated in air at an average heating rate of 8° C./min. Bones caught on fire above 300° C., resembling actual cremation combustion process. At 650° C. bones were removed and allowed to cool to room temperature. Bones looked completely charred, and could easily be broken into smaller fragments. The interior part (i.e. surface) of the bones had a black color, indicating Pyrolysis of organic matters whereas the exterior surfaces, which were exposed to air, had a light cream color indicating oxidation of residual carbon formed in Pyrolysis. The bone fragments were ground in an electric grinder, which resulted in fine powders with a dark grayish-black appearance. Part of the powder was further heated up (or calcined) in air (i.e. calcined) to 900° C. in an electric furnace at an average heating rate of 40° C./min. After heating the ceramic crucible containing the ash (powder) was removed from the furnace and was allowed to cool to room temperature. The calcined powders were almost white in color, and a weight loss of approximately about 9.4% was measured for the sample.

Example 2

This example illustrates a cremation ash embodiment into a glass-ceramic material.

100 grams of the resulting powders were mixed with 35 grams of hydrous borax ($Na_2O \cdot 2B_2O_3 \cdot 10H_2O$), 30 grams of hydrous sodium silicate ($Na_2O \cdot SiO_2 \cdot 5H_2O$), and 50 grams of anhydrous borax in a plastic container. The mixture was then charged into a clay crucible and melted at 1200° C. for 2 hours. The resulting glassy like material was poured out into a rectangular brass mold and was allowed to cool down to room temperature. After cooling the product had an opaque greenish color Example 3

This and the following examples illustrate embodiments of cremation ash into glass.

243.5 grams of powders from the cremation process were mixed with 146.2 grams of anhydrous borax, 73.1 grams of hydrous sodium silicate, 200 grams of a borosilicate glass frit (glass composition is about 60 wt % silica, 30 wt % boron oxide, and 10 wt % sodium and potassium carbonate). The resulting glass was green with white streaks in it.

Example 4

Approximately 2 parts of the resulting glass from example 2 were mixed with 5 parts of the glass frit used in example 2. The mixture was melted at 1150° C. for less than two hours in a clay crucible. The product was a light greenish color glass.

Example 5

This example illustrates the simulation of a cremation process using chicken bones with residual meat. It further illustrates the calcination process required to produce cremation materials free of carbonaceous residues (including organic matters).

Chicken leg bones and meat were processed similar to the beef bones in example 1. The results were almost identical, and the calcination weight loss was approximately 12.9%.

Example 6

This example illustrates various cremation ash embodiments with simple cementaceous materials.

Series of embodiments were prepared from beef bone powders and plaster of Paris (DAP, Duraboard plaster of Paris, DAP inc., Dayton, Ohio). Embodiments were prepared as follows:

Sample #1  48.0 grams of plaster were mixed with 24 grams of water (tap water). The resulting paste was molded into a cylindrical shape, approximately 2.6 cm in diameter, and 5.5 cm in length.
Sample #2  30.8 grams of plaster were mixed with 11.3 grams of calcined beef bone powders, and 21.8 grams water. The mixture was molded in the same mold as sample 1. The set time for sample 2 was faster than sample one, about 5–10 minutes compared to more than one hour.
Sample #3  30.8 grams of plaster were mixed with 11.3 grams of non-calcined beef bone powders, and 23 grams of water. Mold size was the same as the one used for sample #1. The set time for sample 3 was longer than sample 2, between 30 to 60 minutes.
Sample #4  22 grams plaster were mixed with 22 grams of calcined beef bone powders and 22 grams of water. Molding was the same -continued as the previous samples. The set time was between 15 to 30 minutes.

Sample #5  10 grams of plaster were mixed with 30 grams of calcined beef powders and 21 grams of water. Molding was the same as the previous samples. The set time was longer than 60 minutes.

Table 2 summarizes the results of samples 1 through 5.

TABLE 2

| sample # | density gram/cc | wt % of ash in the final product | set time minutes | product appearance |
|---|---|---|---|---|
| 1 | 1.09 | Op | >60 | white, hard, smooth |
| 2 | 1.19 | 32.6 | 5–10 | white, hard, smooth |
| 3 | 1.19 | 32.6 | 30–60 | dark, hard, smooth |
| 4 | 1.2 | 61.1 | 15–30 | white, hard, smooth |
| 5 | 1.17 | 87.9 | >60 | white, soft, powdery |

*calculated as the percentage of the initial mass of bone powders with respect to the mass of the final product.

The results of table 2 indicate that a superior cast product can be easily formulated with bone ash and plaster of Paris. The carbon in the non-calcined bone powders appears to slightly slow down the mixture hardening process. Bone ash can comprise more than 61 wt % of the final product, at around 88 wt % plaster cementing action appears to be insufficient.

Example 7

This example illustrates cremation ash embodiment by ceramic processing.

grams of calcined beef cremation ash were mixed with 1 grams of a sintering aid glass powder (low temperature soldering glass ID# SG-1), and a drop of polyvinyl alcohol (PVA) as binder. The powders and binder were thoroughly mixed in a mortar and pastel. The mixture was then pressed in a cylindrical mold at a pressure of approximately 5 kpsi. The green density was about 1.54 g/cc. The resulting disc was fired in air to about 1170° C., at an average heating rate of 25° C./min. The fired disc had a cream color with green specs. The fired density was approximately 1.9 g/cc.

Example 8

This example illustrates cremation ash embodiment by clay based processing.

12 grams of calcined and finely beef cremation ash were mixed with 112 grams of a pottery clay Amaco® Versa Clay No.20 (Indianapolis, Ind. USA). Approximately 2–3 grams of water was added to the mixture, which was then kneaded to form a plastic clay. The product was shaped into a flat plate, about ¼ thick and dried at around 120 C for about 17 hours. The plate was then fired to about 1100 C to form a bisque body. 8 grams of the same cremation ash but ground to −100 mesh were added to about 100 grams of ceramic glazing compound, F-11, F-series White, (American art Clay Co., Indianapolis, Ind.). The resulting compound was applied over the sheet, and fired to about 1230° C. The resulting embodiment has a very uniform and excellent glossy surface texture.

Example 9

This example illustrates several embodiments where cremation ash is encapsulated in a polymer matrix.

10 grams of Devcon (Danvers, Mass., USA) aluminum putty polymeric epoxy 10610 (9 parts polymer to 2 part curing compound by wt.) were added to 2 grams of finely ground calcined beef cremation residue and mixed thoroughly in a glass container. The mixture was then molded and cured for about 16 hours. The resulting solid material was hard, could be easily machined (e.g. sanded and cut with a band saw). It has a bright silver-color, with a density of about 1.8 grams per $cm^3$.

Same experiment as above was carried out with 5 grams of finely ground calcined beef cremation residue. The mixture was kneaded thoroughly to form a thick paste which could be extruded. The mixture was extruded easily from a 1 cm die and resulted a cylinder with a very fine texture.

Example 10

This example illustrates one embodiment of cremation ash with a metal matrix:

20 grams of tin metal were added to 1 gram of finely ground non-calcined beef bone powders. The mixture was placed in a clay crucible and was heated in air to about 600 C. A graphite lid was placed over the crucible during the heating period to reduce oxygen concentration in the crucible. The melt was poured out in a graphite mold and allowed to cool to room temperature. The ash stayed over the melt because of much lower density compare to molten tin. The combination was cold pressed into a sheet approximately ⅛" thick. The sheet was rolled over the exposed ash particles and was cold pressed into a pellet approximately ½" thick.

Example 11

This example illustrates another embodiment of cremation ash with a metal matrix.

10 grams of −100 mesh copper powder were mixed thoroughly with 1 gram of finely ground and calcined beef cremation ash, also -100 mesh. A few drops of PVA binder (polyvinyl alcohol in water) were added to the mixture to increase the green strength of the composite after cold pressing in a ½" die. The resulting pellet was placed inside a graphite crucible with a graphite lid and heated under nitrogen gas to about 1000 C. the newly formed solid metal matrix composite was allowed to cool to room temperature. The exposed surfaces were polished with a polishing wheel to bring out the shine of the cooper metal.

Example 12

This example illustrates the embodiment of cremation residue and paint according to the method of present invention to form paint-like formulations suitable for paintings.

0.42 grams of non-calcined cremated beef bone powders of Example 1 were mixed with 4.89 grams of ceramic-type paint, (D/S unleaded G/E Green, lot 23400/63/41 from Cookson Matthey Ceramics, Inc., Downintown Pa. 19335). The resulting mixer had an ash loading of about 8 wt %, and a good consistency. The ash-paint was applied to the exterior surface of a glass container. The painting created with the mixture over the glass surface adhered very well without running. The painting was allowed to dry at room temperature.

In the second embodiment, the ash loading was increased to about 18.5 wt %. The mixture had a good consistency, and like the above was applied to the glass surface without any difficulty. The painting was allowed to dry at room temperature. Both ash-paint formulations were fired to about 650° C., and produced excellent color coatings on glass.

Example 13

This example illustrates another method of a cremation ash embodiment with paint.

Cremated beef bone residue was ground and calcined to about 925° C. The resulting powder was free from any visual carbonaceous residue and was completely white. The powders were further ground and screened through a 100 mesh sieve. In the first formulation, 0.25 grams of powder were added to 3 grams of an oil-based color, Permalba white (Martin/Weber Co. Philadelphia, Pa. 19144). The combination of ash and paint was thoroughly mixed, to form a homogenous mixture, with a spatula and was brushed on a paper with very good consistency to paint a flower. In the second formulation, 0.3 grams of calcined and ground powder (−100 mesh) were added to 2 grams of another oil based orange color paint (Grumbacher Inc. Bloomsbury, N.J.), and mixed thoroughly as above. The resulting paint had excellent consistency and was used to paint several flowers.

From the foregoing description and examples, it is apparent that the present invention provides a number of useful techniques and beneficial methods that can be summarized as follows. The present invention provides a unique method to convert ashes or other remains of the cremation into solid and durable objects such as glass, ceramics, clay like objects or embedded into polymers such as epoxies, metals or variety of cementaceous materials such as Portland cement or plaster. The present invention also formulates paints and colors that in part contain ash, and are used to create paintings, drawings and colorings. The solid objects described herein can be made to be functional such as decorative jewelry, glass containers, ceramics or clay wares, or non-functional, such as abstractive shaped art forms and paintings. The inorganic residue described herein may be in part or wholly selected from ashes or bony remains. Both, bottom ash (normally left at the bottom of cremation chamber), or fly ashes (very fine ash that is transported to the exhaust stack and filtered before being releasing to the outside air) can be used. For glass, ceramics and clay based products, appropriate additives may be added to the cremation residue to adjust the composition of the mixture in order to produce a durable and stable product. A computer database may be employed to maintain all the pertaining information related to product and the deceased.

It is also possible to encapsulate the cremation residue in various materials instead of blending as described above. Accordingly the encapsulant can be selected from one or multiple of glass, ceramics, polymers, metals and paints.

While the foregoing invention has been shown and described with reference to various examples and embodiments, it will be understood that various changes in form and detail may be made therein without departing from the spirit and scope of the instant invention.

What is claimed is:

1. A method for processing cremation remains, comprising the steps of:
   creating a residue comprising a cremation remains;
   calcining the residue such that substantially all organics and carbon are removed from the residue;
   combining the calcined residue with an additive; and
   further processing the combined calcined residue and additive to form a solid product that is durable and has a predetermined shape.

2. A method for processing cremation, comprising the steps of:
   creating a residue comprising cremation remains;
   grinding said residue into a homogenized residue;
   calcining said homogenized residue into a oxidized residue, by heating said homogenized residue to a temperature above 600 degree Celsius;
   wherein said oxidized residue is substantially free from both organic and carbon components;
   wherein a second grinding is performed on said oxidized residue;
   wherein said oxidized ground residue is white; and
   wherein said oxidized ground residue has a particle size less than 100 mesh;
   mixing a plurality of paint making ingredients with said ground-oxidized residue into a homogeneous mixture;
   marking said homogeneous mixture on a surface creating a marked surface; and
   drying said marked surface into a solid object.

3. The method for processing cremation remains according to claim 2, wherein said plurality of paint making ingredients includes a paint selected from the group consisting of a ceramic type paint, an oil based paint, an acrylic based paint, and a water based paint.

4. The method for processing cremation remains according to claim 3, wherein said homogeneous mixture is applied to said surface by a technique selected from the group consisting of brushing, spraying, dipping, pouring, drawing, coating, painting, and glazing.

5. The method for processing cremation remains according to claim 2, wherein said plurality of paint making ingredients includes at least one colorant.

6. The method for processing cremation remains according to claim 2, wherein said marked surface is selected from the group consisting of paper, glass, ceramic, plastic, metal, skin, canvas, textile, and wood.

7. The method for processing cremation remains according to claim 2, wherein said drying said marked surface step is performed at room temperature.

8. The method for processing cremation remains according to claim 2, wherein said drying said marked surface step is performed at a temperatures above 100 degrees Celsius.

9. A method for processing cremation remains, comprising the steps of:
   creating a residue comprising cremation remains;
   grinding said residue into a homogenized residue;
   calcining said homogenized residue into a oxidized residue, by heating said homogenized residue to a temperature above 600 degree Celsius;
   wherein said oxidized residue is substantially free from both organic and carbon components;
   wherein a second grinding is performed on said oxidized residue;
   wherein said oxidized ground residue is white; and
   wherein said oxidized ground residue has a particle size less than 100 mesh;
   blending a ceramic material with said ground-oxidized residue into a mixture;
   shaping said mixture into a unfired ceramic object; and
   firing said unfired ceramic object to form a consolidated ceramic object.

10. The method for processing cremation remains according to claim 9, wherein said ceramic material comprises at least one of a plurality of pottery clays.

11. The method for processing cremation remains according to claim 9, wherein said ceramic material is selected from the group consisting of earthenware clay, stoneware clay, Raku clay, Porcelaine clay, and Bone china.

12. The method for processing cremation remains according to claim 9, wherein said ceramic material comprises of at least one of inorganic oxides.

13. The method for processing cremation remains according to claim 9, wherein said ceramic material comprises a binder.

14. The method for processing cremation remains according to claim 9, further comprising glazing said unfired ceramic object.

15. The method for processing cremation remains according to claim 9, further comprising:

glazing said consolidated ceramic object with a ceramic glazing compound into a glazed consolidated ceramic object; and firing said glazed consolidated ceramic object into a fired glazed consolidated ceramic object.

16. The method for processing cremation remains according to claim 15, wherein said ceramic glazing compound contains ground-oxidized cremation remains.

17. A method for processing cremation remains, comprising the steps of:

creating a residue comprising cremation remains;

grinding said residue into a homogenized residue;

calcining said homogenized residue into a oxidized residue, by heating said homogenized residue to a temperature above 600 degree Celsius;

wherein said oxidized residue is substantially free from both organic and carbon components;

wherein a second grinding is performed on said oxidized residue;

wherein said oxidized ground residue is white; and wherein said oxidized ground residue has a particle size less than 100 mesh;

mixing said ground-oxidized residue with at least one of cementaceous products and polymer products into a mixture; and casting said mixture into a shaped body.

18. The method for processing cremation remains according to claim 17, wherein said polymer product is selected from the group consisting of a thermoset material and a thermoplastic material.

19. The method for processing cremation remains according to claim 17, wherein said cementaceus product is selected from the group consisting of Portland cement, plaster, a phosphate based cement, and an alumina-based cement (P8, L3).

* * * * *